United States Patent
Dotte

(10) Patent No.: US 7,635,105 B2
(45) Date of Patent: Dec. 22, 2009

(54) EJECTION DEVICE, EJECTABLE HATCH AND AIRCRAFT HAVING AT LEAST ONE EJECTABLE HATCH

(75) Inventor: Benoit Dotte, Brax (FR)

(73) Assignee: Airbus France (FR)

( * ) Notice: Subject to any disclaimer, the term of this patent is extended or adjusted under 35 U.S.C. 154(b) by 209 days.

(21) Appl. No.: 11/749,413

(22) Filed: May 16, 2007

(65) Prior Publication Data

US 2008/0128555 A1    Jun. 5, 2008

(51) Int. Cl.
*B64C 1/14*    (2006.01)
(52) U.S. Cl. ............... 244/129.5; 244/118.2; 244/120; 244/118.3; 244/118.1; 244/119; 244/131; 244/129.4; 16/222; 16/254; 16/357; 16/356; 16/359; 49/397
(58) Field of Classification Search ............... 244/118.3, 244/131, 129.4, 129.5, 118.2, 118.1, 119, 244/120; 49/397, 141; 16/254, 260, 261, 16/262, 357, 356, 359
See application file for complete search history.

(56) References Cited

U.S. PATENT DOCUMENTS

| | | | | |
|---|---|---|---|---|
| 2,797,884 A | * | 7/1957 | Peed, Jr. ................. | 244/129.5 |
| 2,910,255 A | * | 10/1959 | Johnson ................. | 244/129.6 |
| 3,085,297 A | * | 4/1963 | Linderfelt .............. | 49/248 |
| 3,771,749 A | | 11/1973 | Smialowicz | |
| 4,102,011 A | * | 7/1978 | Clack, Jr. ............... | 16/261 |
| 5,031,863 A | * | 7/1991 | Noble ..................... | 244/129.5 |
| 5,054,165 A | * | 10/1991 | Marchione ............. | 16/270 |
| 5,067,201 A | * | 11/1991 | Marchione ............. | 16/270 |
| 5,116,099 A | * | 5/1992 | Kwasnik et al. ........ | 297/188.15 |
| 5,305,969 A | * | 4/1994 | Odell et al. ............. | 244/129.5 |
| 5,341,542 A | * | 8/1994 | Hannan et al. .......... | 16/289 |
| 5,570,493 A | * | 11/1996 | Gulick .................... | 27/18 |
| 5,704,569 A | * | 1/1998 | Daniels .................. | 244/129.5 |
| 5,921,307 A | * | 7/1999 | Ford et al. .............. | 160/229.1 |
| 5,931,415 A | * | 8/1999 | Lingard et al. ......... | 244/129.5 |
| 6,292,981 B1 | * | 9/2001 | Ford et al. .............. | 16/357 |
| 6,425,205 B2 | * | 7/2002 | Wygle et al. ........... | 49/349 |
| 6,691,953 B2 | * | 2/2004 | Leclerc .................. | 244/129.5 |
| 7,100,242 B2 | * | 9/2006 | Maierholzner ......... | 16/319 |
| 7,150,071 B2 | * | 12/2006 | Collene et al. ......... | 16/289 |
| 2003/0141415 A1 | * | 7/2003 | Leclerc .................. | 244/129.5 |

FOREIGN PATENT DOCUMENTS

| | | |
|---|---|---|
| EP | 0 876 954 A2 | 5/1998 |
| EP | 1 332 962 A1 | 8/2003 |
| GB | 2 181 780 A | 4/1987 |

* cited by examiner

*Primary Examiner*—Michael R Mansen
*Assistant Examiner*—Justin Benedik
(74) *Attorney, Agent, or Firm*—Perman & Green, LLP

(57) ABSTRACT

An ejection device for an aircraft hatch having at least one articulation hinge. The articulation hinge is provided with a lower element designed to be mounted in rotation on structure of the aircraft, and an upper element designed to be joined to the hatch panel. The lower element and the upper element are connected to one another in a reversible manner. The ejection device has guide means in which the upper element of the articulation hinge is engaged, to hold the upper element in the axis of rotation (A) of the lower element during the activation of the hatch. The upper element of the articulation hinge can be separated from the guide means beyond a critical swing angle, so that the upper element is separated from the lower element of the articulation hinge. The invention also concerns an ejectable hatch for an aircraft.

8 Claims, 3 Drawing Sheets

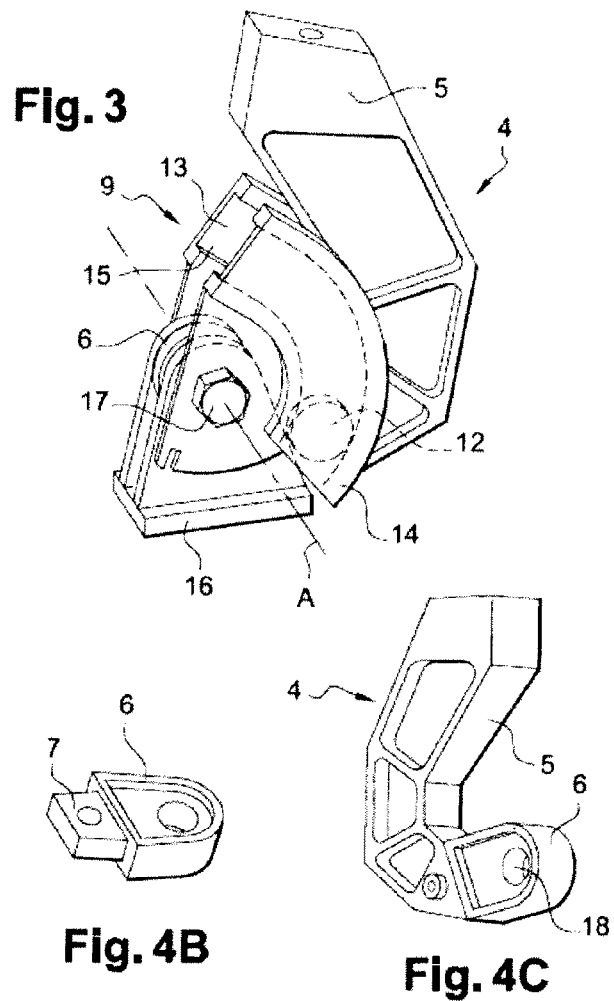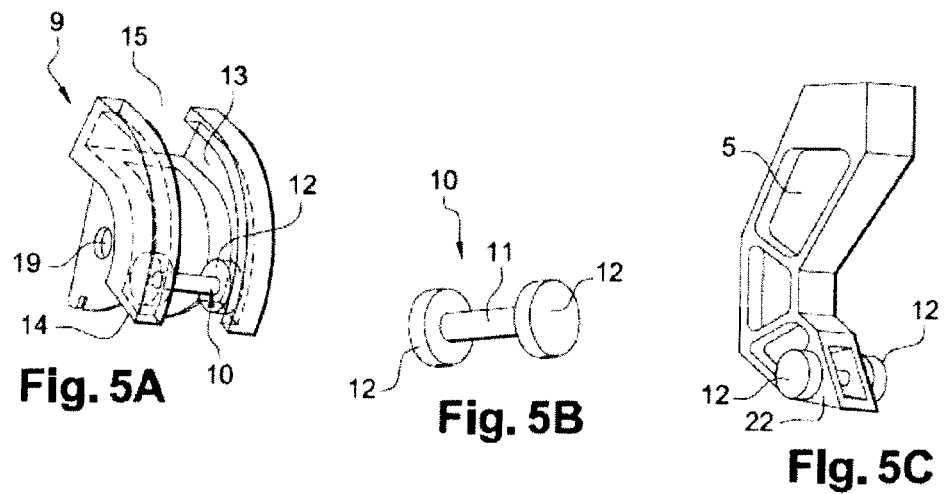

EJECTION DEVICE, EJECTABLE HATCH AND AIRCRAFT HAVING AT LEAST ONE EJECTABLE HATCH

FIELD

The invention relates to an ejection device for an aircraft hatch. More precisely, the invention relates to a device for connecting an aircraft hatch to said aircraft that can be detached, when necessary, from said aircraft so that the hatch can be jettisoned. The invention also relates to an aircraft hatch having such an ejection device.

Such an ejectable hatch is applied notably in the field of military aircraft whose hatches need to be ejectable in flight in order to evacuation personnel or a load.

BACKGROUND

Generally, a hatch is held onto the fuselage of an aircraft by means of at least one hinge, permitting articulating the hatch onto the aircraft wall, and by means of compensation devices, permitting holding the hatch flattened in closed position, supporting the weight of said hatch and damping down its opening and closing. The hinge or hinges, like the compensation devices, connect the hatch to the structure of the aircraft. It is therefore necessary, in order to make the hatch ejectable, to detach the hinges and the compensation device from the hatch before ejection.

A deactivation system is known that permits detaching the hinges and compensation devices of the hatch by means of an ejection handle. However, once these fastening elements have been detached from the hatch, the flight personnel must force the hatch toward the outside so that it falls to the ground, with the risk it may pull along some or all of the personnel during its fall. The use of explosive means in order to propel the hatch to the outside is also known. Such explosives are not safe, because the risk of failure or untimely detonation is significant.

SUMMARY

In the invention, one seeks to create an ejection device that can permit ejecting an aircraft hatch according to the users' needs, in a mechanical and controlled manner.

In order to do this, the invention proposes to attach a hatch to the structure of the aircraft by means of one or more articulated arms. The articulated arm or arms are formed of two independent parts that can be connected to one another in a reversible manner. The hatch can also have a compensation system that can damp down the opening and closing movements of said hatch. Under normal use, the opening amplitude of the hatch is limited, i.e., the maximum swing angle is fixed and determined. For example, springs of the compensation system, which are connected to the hatch and the fuselage, limit the course of the hatch during its opening. The first part of the articulated arm is connected in rotation to the structure of the fuselage, while the second part of the articulated arm is joined to the hatch structure. The two parts of the articulated arms are held connected to one another by means of a holding device. The holding device prevents any radial displacement of the second part of the articulated arm relative to the first part of said arm. By maintaining the one-piece integrity of the articulated arm, the holding device compels the second part of the articulated arm to follow the movements of the first part of said articulated arm. Thus, when the first part of the articulated arm is driven in rotation, the second part of the arm, and therefore also the aircraft hatch, follow the same rotation movement, bringing about the opening of the hatch.

Preferentially, the dimensions of the holding device coincide with the maximum displacement, or opening amplitude, allowed for the hatch in normal operating mode, i.e., on the ground. Thus, as soon as the opening amplitude of the hatch goes beyond the maximum opening amplitude allowed for the hatch in normal opening mode, the holding device no longer holds the second part of the articulated arm in the axis of the first part. The second part of the articulated arm is detached then from the first part and is no longer connected to the aircraft structure. Due to gravity, the second part of the articulated arm, and therefore also the hatch, falls to the ground. It is also possible to provide that the dimensions of the holding device are slightly greater, so that it temporarily continues to accompany the movement of the second part of the articulated arm beyond the allowed maximum hatch opening amplitude in normal operating mode. The fall of the hatch occurs as soon as the holding device no longer holds the second part of the articulated arm, as long as no other device holds the hatch to the fuselage.

Thus, with the invention, the normal device for opening and closing the aircraft hatch can also serve as the ejection device for said hatch. In fact, the device according to the invention is also provided so as to hold the hatch onto the structure of the aircraft up to a certain degree of opening of the hatch; beyond this degree of opening, the two parts of the articulated arm are disconnected from one another, leading to the fall of the hatch.

The subject of the invention is therefore an ejection device for an aircraft hatch, having at least one articulation hinge that can articulate a panel of the hatch to a frame of the hatch, characterized in that the articulation hinge is provided with a lower element, designed to be mounted in rotation on the aircraft structure, and an upper element, designed to be joined to the hatch panel, the lower element and the upper element being connected to one another in a reversible manner, the ejection device also having guiding means in which the upper element of the articulation hinge is engaged, so as to hold said upper element in the axis of rotation of the lower element of said hinge during activation of the hatch.

Holding the connection between the upper element and the lower element of the articulation hinge is guaranteed by the guiding means, which impose a movement on the upper element that is simultaneous with and identical to the movement of the lower element, while the upper element is guided by the guiding means.

According to the examples of embodiment of the hatch ejection device according to the invention, it is possible to provide all or part of the following additional characteristics:

The upper element of the articulation hinge can be disengaged from the guiding means beyond a critical swing angle of said hinge, so that the upper element detaches from the lower element of the articulation hinge.

Critical swing angle means a degree of opening, or angle of rotation of the hinge and therefore the hatch fastened to it, towards the outside of the aircraft, corresponding to the maximum possible degree of opening of the hatch in normal functioning, i.e., when the aircraft is on the ground.

The guiding means have a guiding ramp that can be attached to the aircraft structure and a double guide roller joined to the upper element of the articulation hinge, said double guide roller being able to slide in the guide ramp so as to hold said upper element in the axis of rotation of the lower element of said hinge, the guide ramp is provided with an upper end open towards the outside, so as to permit withdrawing the double guide roller from the guide ramp beyond the critical swing angle of the articulation hinge;

the guide ramp is flared at the level of the upper end of said ramp so as to allow a radial displacement of the upper element of the articulation hinge relative to the axis of rotation of the lower element beyond a critical swing angle of the articulation hinge;

The invention also concerns an ejectable hatch for an aircraft having an ejection device according to the invention.

It is possible to provide that the articulation hinge of the ejection hatch according to the invention is interposed between a lower edge of the hatch frame and a lower edge of the panel of said hatch.

Likewise, the ejectable hatch can also have deactivation means that can disconnect the compensation means of the hatch.

The subject of the invention also is an aircraft having at least one ejectable hatch according to the invention.

BRIEF DESCRIPTION OF THE DRAWINGS

The invention will be better understood upon reading the description that follows and examining the figures that accompany it. These figures are presented by way of indication and do not at all limit the invention.

The figures show:

FIG. 3: a partial schematic representation of an ejection device according to the invention at the level of its connection to the aircraft structure;

FIGS. 4A, 4B and 4C: schematic representations of an articulation hinge according to the invention;

FIGS. 5A, 5B and 5C: schematic representations of different elements of the ejection device according to the invention;

DETAILED DESCRIPTION

Figure 1:
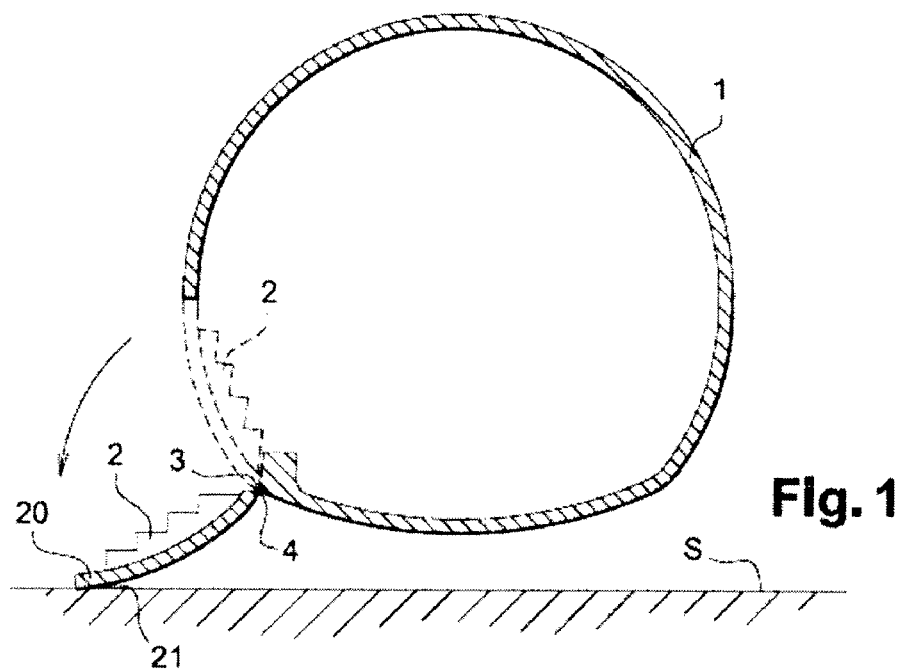
FIG. 1: a schematic representation of a cross section of an aircraft at the level of an ejectable hatch according to the invention in closed and open position, when the aircraft is on the ground.

A cross section of an aircraft 1 at the level of an articulated hatch 2 is shown in FIG. 1.

A lower part 3 of hatch 2 is mounted in rotation on a lower part of the structure of aircraft 1. The joint between hatch 2 and aircraft 1 permits, during activation of hatch 2, said hatch to swing toward the outside of said hatch 2 to open it, then to return it to the closed position by rotation of said hatch 2 in the reverse direction. Activation of the hatch means its opening and closing.

When the airplane is on the ground, the displacement of hatch 2 is limited by the presence of ground S against which the high end 20 comes to stop 21. The displacement of hatch 2 can also be limited by the presence of a compensation system (not shown), notably having springs connecting the structure of hatch 2 to the structure of aircraft 1 and participating in holding the hatch 2 onto aircraft 1.

Figure 2:
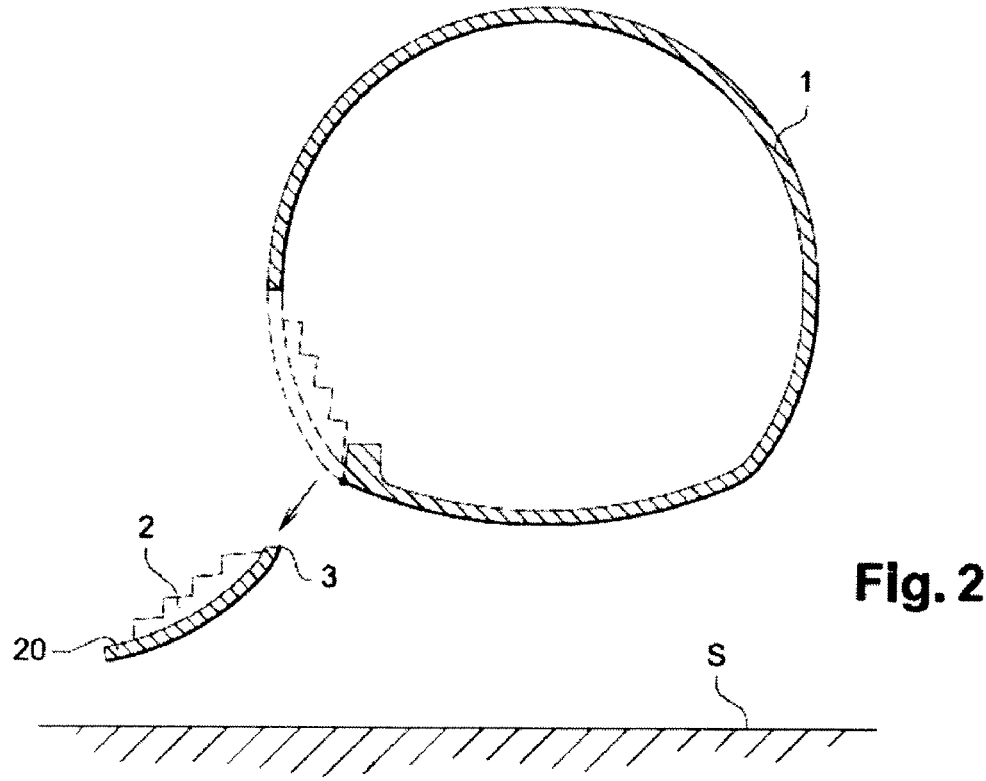
FIG. 2: a schematic representation in cross section of an aircraft at the level of an ejectable hatch according to the invention in closed hatch position and ejected hatch position.

Conversely, as is shown in FIG. 2, when aircraft 1 is in flight, or at least when the ground S is far from aircraft 1, and on the condition that the compensation system is disconnected, hatch 2 can be separated from the structure of aircraft 1 during the activation of said hatch 2. In fact, high end 20 of hatch 2 no longer encounters stop 21 that can limit the course of hatch 2. The swing angle of hatch 2 is thus greater than the maximum swing angle provided, or critical swing angle.

In the invention, the fact that in the absence of stop 21, the displacement of hatch 2 is no longer limited, is used to provide one or more articulation hinges 4, which, in normal use, i.e., in the presence of ground S, make use of stop 21, assuring that hatch 2 is held onto the structure of aircraft 1, and in the absence of such a stop 21, participate in the separating of hatch 2 from the structure of aircraft 1. For this, the lower end 3 of hatch 2 is provided with at least one articulation hinge 4 according to the invention and which is shown in the following figures.

As is shown in FIGS. 4A, 4B, and 4C, articulation hinge 4 according to the invention has an upper element 5 onto which is fitted a lower element 6. More precisely, a projection 7 of lower part 6 of articulation hinge 4 is locked in a recess 8 designed adapted to the lower part of 5 of articulation hinge 4. Upper element 5 of articulation hinge 4 is designed to be joined to a panel of hatch 2, while lower element 6 of articulation hinge 4 is designed to be fastened in rotation on a yoke of aircraft structure 1. Thus articulation hinge 4 bearing the panel of hatch 2 is mounted in rotation on the structure of aircraft 1.

In the example shown in FIGS. 1 and 2, hinge 4 according to the invention connects a lower edge of hatch 2 to a lower edge of the hatch frame, created on the structure of aircraft 1. Of course, it is also possible to provide that hinge 4 according to the invention connects a lateral edge of hatch 2 to a lateral edge of the frame of hatch 2. Likewise, it would also be possible to foresee using hinge 4 according to the invention to connect an upper edge of hatch 2 to an upper edge of the hatch frame.

Hatch 2 according to the invention also has guide means 9, 10, assuring the connection between the two elements 5 and 6 of articulation hinge 4. For this, guide means 9, 10 hold upper element 5 of articulation hinge 4 in the axis of rotation A of lower element 6 of said hinge 4. In fact, when lower element 6 of articulation hinge 4 is driven in rotation, upper element 5 follows this rotation movement and remains in the axis of lower element 6. Projection 7 thus remains held in recess 8, guaranteeing the one-piece integrity of articulation hinge 4. Guide means 9, 10 should therefore assure that upper element 5 is radially held relative to lower element 6 to prevent any displacement of said upper element 5 relative to lower element 6, which could lead to projection 7 coming loose from its recess 8.

In the example shown in FIGS. 5A, 5B and 5C, guide means 9, 10 have a guide ramp 9, or gutter, in which a double guide roller 10 slides.

Double guide roller 10 has an axle 11 that bears, at each of its ends, a round piece 12. Axle 11 is designed to cross lower end 22 of upper element 5 of articulation hinge 4, so that each round piece 12 is situated on each of the lateral flanks of lower end 22 of upper element 5. Each round piece 12, which forms a projection onto the lateral flanks of upper element 5, is designed to be inserted in rails 13 of guide ramp 9, and to slide therein. Lower end 14, as well as upper end 15 of guide ramp 9, are open towards the outside, permitting the introduction of double guide roller 10 between the two rails 13 of ramp 9.

In FIG. 3, articulation hinge 4 according to the invention can be seen joined to a yoke 16 fastened onto the structure of aircraft 1, and on which guide means 9, 10 are also mounted.

Yoke 16 has a U shape, lower element 6 of articulation hinge 4 being placed between the arms of the U of said yoke 16. Lower element 6 of articulation hinge 4 is mounted in rotation on yoke 16 by means of a screw 17. Screw 17 crosses from one side to the other of the two arms of the U of yoke 16, as well as a screw passage opening 18 created on lower element 6 of articulation hinge 4.

Guide ramp 9 is also placed between the two arms of the U of yoke 16 to which it is attached. For this, guide ramp 9 is provided with a screw passage opening 19 coinciding with screw passage opening 18 of lower element 6, and also crossed through by screw 17.

First, double guide roller 10 is mounted on upper element 5 of articulation hinge 6, which may already be connected to the lower element. Then double guide roller 10 is introduced between the two rails 13 of guide ramp 9, by upper end 15 or lower end 14, in order to bring each round piece 12 into a rail 13. Once the articulation hinge 4/guide means 9, 10 assembly is mounted, guide ramp 9 is fastened to yoke 16. Lower end 14 of said guide ramp 9 then comes to abut against yoke 16, so that double guide roller 10 cannot come out again through lower end 14 of the recess created between the two rails 13 of guide ramp 9.

Upper element 5 of articulation hinge 4, on which is locked lower element 6 of said hinge 4, is held radially between the two rails 13 of guide ramp 9 by double guide roller 10. To be held radially means that no displacement is possible of upper element 5 in the direction of either of the two rails 13 of guide ramp 9. This radial hold assures keeping projection 7 of lower element 6 locked in recess 8 of upper element 5 of articulation hinge 4. This radial hold is assured over the entire course of guide ramp 9. The course of guide ramp 9 means the distance over which round pieces 12 can move, i.e., the distance between the two ends 14 and 15 of guide ramp 9. The course of guide ramp 9 corresponds here to the length of rails 13.

Upper end 15 of guide ramp 9 emerges toward the outside, allowing round pieces 12 of double guide roller 10 to disengage from rails 13 and therefore to come out of guide ramp 9. Beyond upper end 15 of guide ramp 9, upper element 5 of articulation hinge 4 is therefore no longer held radially. The upper element can then be detached from the lower element of articulation hinge 4, and therefore also from yoke 16.

The course of double guide roller 10, and therefore the length of rails 13 of guide ramp 9, is calculated so that, under normal activation conditions of hatch 2 provided with articulation hinge 4 according to the invention, round pieces 12 of double guide roller 10 are contained between two ends 14, 15 of guide ramp 9. Thus the radial hold of upper element 5 of articulation hinge 4 is guaranteed throughout the opening and closing phases of hatch 2.

The critical swing angle α of hinge 4, for example, is strictly greater or at least equal to the swing angle of hatch 2 for which upper part 20 comes to stop 21 against the ground S. Thus, it is assured that upper element 5 of articulation hinge 4 does not become detached from the aircraft under normal conditions of use of hatch 2.

It is also possible, in order to assure that the allowed displacement limit of hatch 2 is respected under normal use conditions, to provide hatch 2 with additional means for holding hatch 2 onto the structure of aircraft 1. For example, these holding means belong to the compensation system designed to damp down the movements of the hatch when it is opened and closed.

When users wish to open and eject hatch 2 according to the invention, it is sufficient to swing hatch 2 beyond critical swing angle α of articulation hinge 4, so that round pieces 12 of double guide roller 10 leave guide ramp 9 through upper end 15. Since upper end 5 of articulation hinge 4 is no longer radially held in the axis of rotation A of lower element 6, projection 7 is detached from upper element 5 by coming out of recess 8. Upper element 5 of hinge 4 is then detached from the aircraft structure. The part closing hatch 2, i.e., the panel connected to upper element 5. is no longer connected to the structure of aircraft 1 and falls to the ground due to gravity and the weight of the hatch.

Figure 6A:
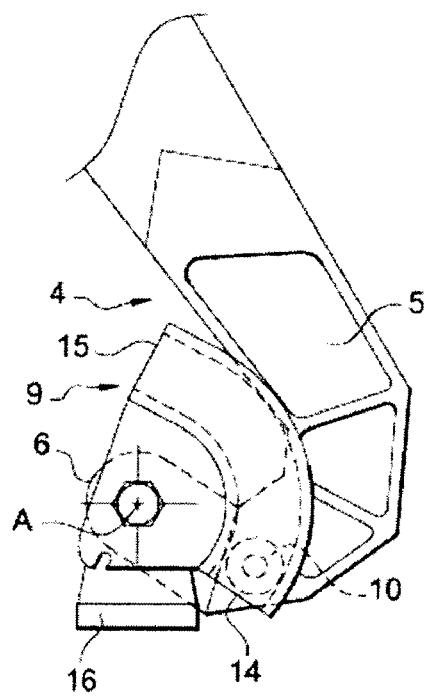
FIGS. 6A, 6B and 6C: schematic representations of the ejection device according to the invention at different degrees of swing.
Figure 6B:
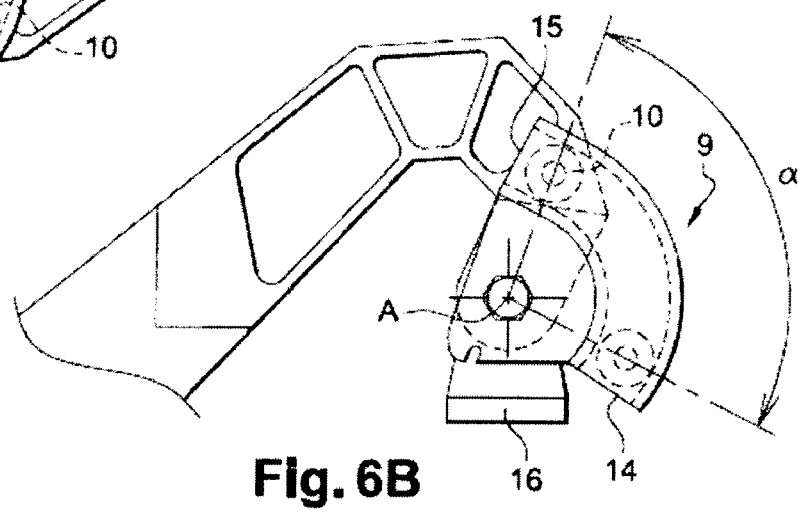
Figure 6C:
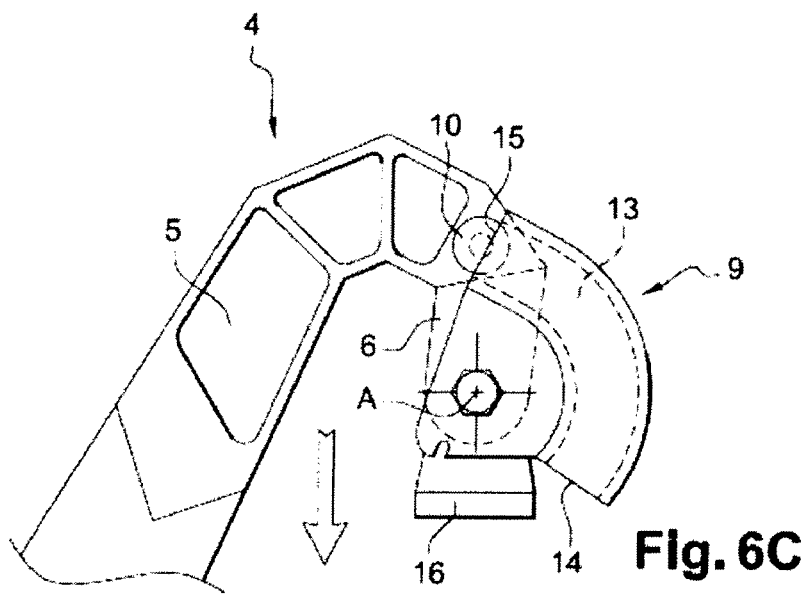

In FIGS. 6A, 6B and 6C are shown three positions of articulation hinge 4 according to the invention relative to guide ramp 9.

In FIG. 6A, hatch 2 is in closed position. Upper element 5 of articulation hinge 4 and lower element 6 are interlocked so as to form a one-piece hinge 4. Guide roller 10 is situated at the level of lower end 14 of guide ramp 9.

In FIG. 6B, the displacement of hatch 2 corresponds to the maximum allowed displacement. In fact, double guide roller 10 is situated at the level of upper end 15 of guide ramp 9. Critical swing angle α of articulation hinge 4 is reached.

In FIG. 6C, critical swing angle α of hinge 4 is surpassed, guide roller 10 comes out of rails 13 of guide ramp 9. Upper part 5 of articulation hinge 4 is no longer held in the axis of rotation A of lower element 6 of said hinge 4. Upper part 5 of articulation hinge 4 can then be detached from lower element 6, which itself remains joined to yoke 16 and therefore to the structure of aircraft 1. Upper 5 of hinge 4 and the assembly of hatch 2, due to weight and gravity, fall in the direction of the ground.

In another example of embodiment, guide ramp 9, which flares at the level of upper end 15, is used. Flaring means that the distance between the two rails 13 of guide ramp 9 is increased relative to this same distance at the level of lower end 14. Round pieces 12 of double guide roller 10 are therefore no longer held in their respective rails 13 at the level of upper end 15. The radial displacement of upper element 5 of hinge 4 is therefore made possible at the level of upper end 15 of guide ramp 9, leading to a separation of the two elements 5 and 6 of articulation hinge 4.

In order to eject a hatch 2 according to the invention in flight, it is therefore sufficient, after having deactivated a possible compensation system, in order to laterally separate hatch 2 from the structure of aircraft 1, to proceed, for example by means of the usual opening handle, to opening hatch 2 by swinging said hatch 2 toward the outside. To the extent that no element limits the course of hatch 2, this hatch swings into space when upper element 5 of articulation hinge 4 is separated from lower element 6.

The invention claimed is:

1. An ejection device for an aircraft hatch comprising:
at least one articulation hinge constructed to support the hatch for pivoting movement on the aircraft about an axle providing a pivot axis, said articulation hinge having a first element connected to the hatch at one end and a second element, releasably attached to the other end of the first element, said second element being attached to the aircraft by the axle for pivotal movement about the axis;
a guide assembly further comprising a guide ramp mounted on the axle and having a fixed channel constructed therein, and a guide roller assembly mounted on the first element and engaging the guide ramp for sliding motion in the fixed channel; and
further wherein the radial movement of the first element with respect to the second element is restricted by the guide assembly in order to maintain the first element attached to the second element during normal pivotal movement of the hatch, and to permit the first element to be detached from the second element, wherein the guide roller freely rolls out an open end of the guide ramp, if the hatch is opened through an angle in excess of a critical angle.

2. The ejection device according to claim 1, wherein said channel is constructed in the form of a segment of a circle of predetermined radius and extending through a predetermined critical angle, and the first element of the articulation hinge can be separated from the guide assembly when pivoted beyond the critical angle of said hinge, so that the first element separates from the second element of the articulation hinge.

3. The ejection device according to claim 1, wherein the guide ramp comprises opposing guide rails fastened to structure of an aircraft on the axle and the guide roller comprises a double guide roller joined to the first element of the articulation hinge, said double guide roller being able to slide in the opposing guide rails of the guide ramp so as to hold said first element in a fixed radial position with the second element during normal operation.

4. The ejection device according to claim 3, further comprising that the guide ramp is provided with an upper end open towards the outside, so as to permit the withdrawal of the guide roller from the guide ramp when the hatch is opened beyond the critical angle of the articulation hinge.

5. The ejection device according to claim 3, further comprising that the guide ramp is flared at the level of an upper end of said ramp so as to allow a radial displacement of the first element of the articulation hinge relative to the first element.

6. An ejectable hatch for aircraft having an ejection device according to claim 1.

7. The ejectable hatch according to claim 6, wherein the articulation hinge is interposed between a lower edge of a hatch frame, and a lower edge of a frame of the aircraft so that the extent that the hatch may be opened is limited by the ground during normal operation.

8. The ejectable hatch according to claim 6, further comprising a hatch damping system and deactivation means that can disconnect the hatch damping system from said hatch.

\* \* \* \* \*

UNITED STATES PATENT AND TRADEMARK OFFICE
CERTIFICATE OF CORRECTION

PATENT NO. : 7,635,105 B2 Page 1 of 1
APPLICATION NO. : 11/749413
DATED : December 22, 2009
INVENTOR(S) : Benoit Dotte It is certified that error appears in the above-identified patent and that said Letters Patent is hereby corrected as shown below:

On the cover page add item (30), --Foreign Application Priority Data: May 15, 2006 (FR) 06 51751--

Signed and Sealed this

Twenty-fourth Day of August, 2010

David J. Kappos
*Director of the United States Patent and Trademark Office*